Patented Apr. 12, 1949

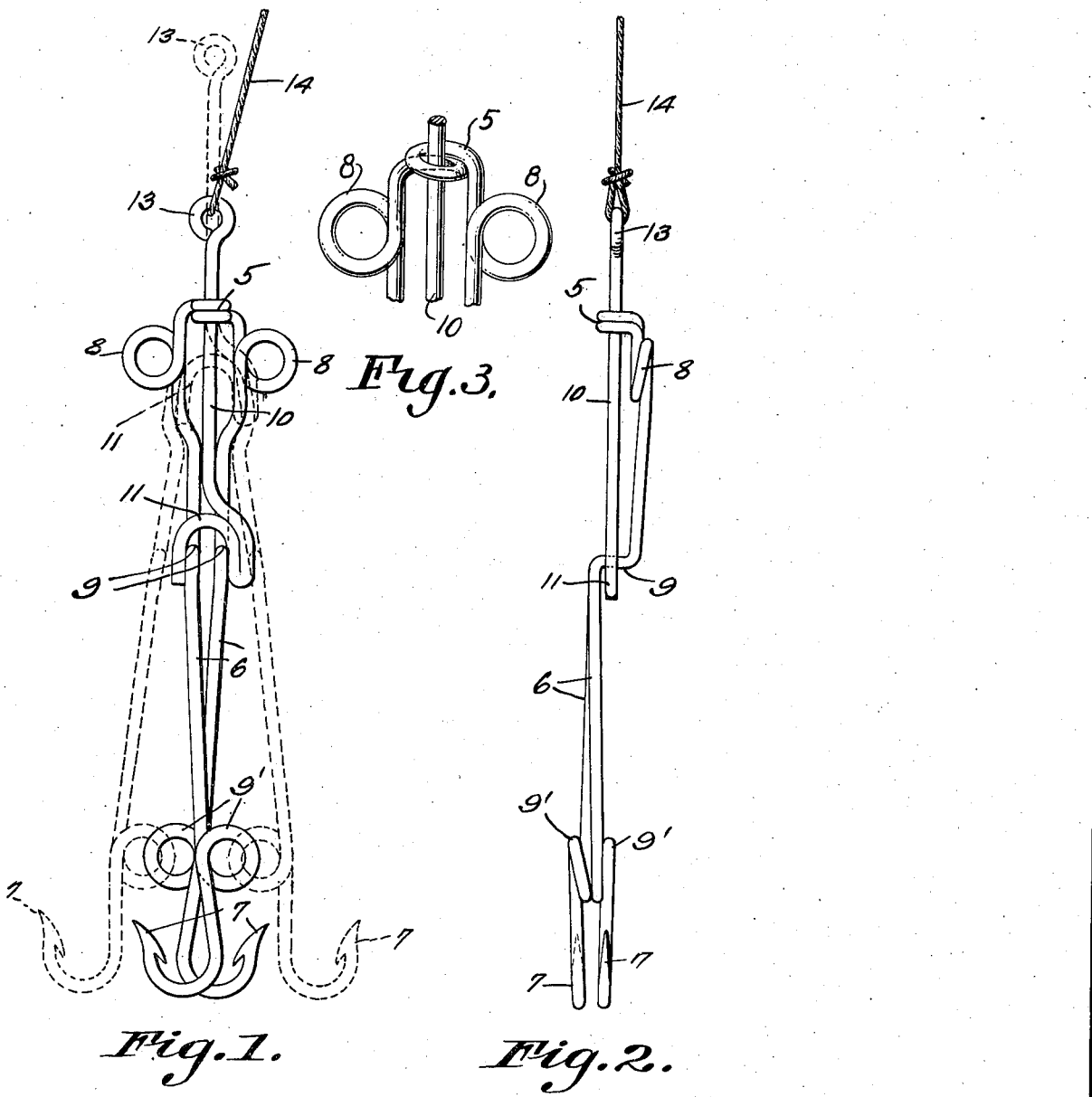

2,466,844

UNITED STATES PATENT OFFICE 2,466,844

FISHHOOK

John S. Garner, Darlington, S. C.

Application September 11, 1945, Serial No. 615,532

3 Claims. (Cl. 43—37)

This invention relates to fishing hooks, the primary object of the invention being to provide a fishing hook embodying a pair of hooks comprising spring arms normally held in a set position, and adapted to spread laterally to cause the hooks to catch into the mouth of the fish attempting to remove the bait from the hooks.

Another object of the invention is to provide a fish hook having loops or eyes formed in such proximity to the hooks that they will guard the hooks against snagging roots, grass or other marine growth.

Still another object of the invention is to provide a trigger adapted to hold the spring fish hooks in a set position, the trigger being operated by a pull directed to the hook by the fish attempting to remove the bait, releasing the hook to move outwardly to catch the fish.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1 is a front elevational view of a hook constructed in accordance with the invention, illustrating the positions of the hooks when in a set position, the hooks being shown in dotted lines as released.

Figure 2 is an edge elevational view of the hook.

Fig. 3 is a fragmental perspective view illustrating the connection between the upper ends of the fish hook shanks and trigger.

Referring to the drawing in detail, the spring fish hook comprises a length of wire material commonly employed in fish hook construction, the length of wire material being bent intermediate its ends to provide an eye 5 which is disposed at right angles with respect to the shanks 6 of the fish hooks 7. Adjacent to the eye 5 and formed in each shank 6, are spring eyes 8 which in turn are disposed at right angles to the eye 5.

The shanks 6 are formed with offset portions 9 disposed intermediate the ends of the shank, the free ends of the shanks being formed into the hooks 7. At points adjacent to the hooks, are spring eyes 9' which are disposed with their side faces parallel with the shanks 6 and hooks 7, the spring eyes being disposed in such relation with respect to the hooks, that the eye 9' of one shank will provide a guard for the hook 7 of the opposite shank and prevent the hook from snagging roots, stones, or the like, over which the hooks may be pulled.

The trigger embodies a rod 10 that slides through the eye 5, the trigger having a substantially U-shaped end portion 11 adapted to grip the portions 9 and hold them together, in a position as shown by Figure 1. The hooks are now in their set positions where they have been moved to overlap each other.

An eye 13 is formed in one end of the rod 10 and affords means whereby the fishing line 14 may be connected to the trigger.

From the foregoing it will be seen that due to the construction shown and described, the bait may be positioned over the hooks 7, and the shanks of the hooks moved towards each other, where they are held in position by the U-shaped portion 11 of the trigger, which is moved to grip the portions 9.

It is obvious that a fish attempting to remove the bait from the hooks, will cause a pull to be directed to the hooks, with the result that the U-shaped portion of the trigger will be moved out of contact with the offset portions 9 of the shanks 6, releasing the shanks to the action of the springs 8. The shanks together with the hooks formed at the free ends thereof, will be moved laterally to catch into the walls of the mouth of the fish attempting to remove the bait.

What is claimed is:

1. A fishing hook comprising a length of wire material bent intermediate its ends providing a pair of spring arms, an eye member formed between the arms and being disposed at right angles to the spring arms, a trigger embodying a rod movable through the eye member and adapted to engage the spring arms, normally holding the spring arms together, said trigger having an eye to which a fishing line is connected, and said trigger adapted to release said arms when the trigger is pulled, and spring eyes adapted to urge said arms outwardly when released.

2. A fishing hook comprising a length of wire material bent intermediate its ends providing a pair of identical arms having offset portions, said arms having an eye formed at the point of connection between the arms, and said eye being disposed at right angles to the arms, a trigger rod movable through said eye and adapted to grip the arms, normally holding the arms together, said trigger rod having an eye to which a fishing line is secured, said trigger rod adapted to move, releasing the arm for outward movement when said trigger rod is pulled, and hooks formed at the free ends of the arms.

3. A fishing hook comprising a length of wire material bent intermediate its ends providing a pair of spring arms, hooks at the free ends of the arms, a trigger rod slidably connected with the arms and adapted to grip the arms, normally holding the arms together, said trigger rod having an eye to which a fishing line is connected whereby a pull directed to the trigger rod will release the trigger rod and arms of the hook, and eye members formed on the arms at points adjacent to the hooks, the side of the eye member of one arm being substantially in the same plane with the hook of the other arm, each eye constituting a guard for a hook.

JOHN S. GARNER.

REFERENCES CITED

The following references are of record in the file of this patent:

UNITED STATES PATENTS

| Number | Name | Date |
|---|---|---|
| 618,764 | Anderson | Jan. 31, 1899 |
| 745,437 | Hise | Apr. 24, 1903 |
| 1,334,839 | Cole | Mar. 23, 1920 |